3,549,342
METHOD OF MAKING ABRASIVES FOR GRINDING TOOLS

Erich G. Hayek, Innsbruck, Austria, assignor to Elektroschmelzwerk Kempten G.m.b.H., Munich, Bavaria, Germany, a corporation of Germany
No Drawing. Filed Dec. 2, 1968, Ser. No. 780,548
Claims priority, application Austria, Dec. 1, 1967, A 10,855/67
Int. Cl. C08g 51/12; C08h 17/12
U.S. Cl. 51—298     1 Claim

ABSTRACT OF THE DISCLOSURE

Manufacture of abrasives for use in grinding tools, wherein particles of a non-metallic, non-oxygenic abrasive material have their surfaces corroded and roughened and tenaciously bonded together by an inorganic or organic bonding agent.

BACKGROUND OF THE INVENTION

Apart from the specific properties of abrasives and of their binding agent, the strength of the bond between these two materials is of considerable importance with regard to the effectiveness and the life span of grinding tools.

Some of the most effective abrasives, particularly non-metallic hard materials like boron carbide, silicon carbide, silicon boride, silicon nitride, exhibit only a slight affinity toward various binding agents and therefore do not lend themselves to use in abrasive tools in such a versatile manner as corundum, for instance. Attempts have been made to get around this difficulty by either using only particular binding agents for grinding tools, or by setting up affined intermediate layers between the two materials in order to obtain a better binding, as for instance through the vaporation of silicon carbide with silicons in vacuum. However, so far no generally satisfactory solution of the problem from the economical and technical standpoint has been found.

SUMMARY OF THE INVENTION

The object of my invention is the application of non-metallic, non-oxygenic compounds with the character of hard material that have been subjected to corrosion before the binding, as abrasives for the manufacture of inorganic or organically bound grinding tools.

I have found that it is possible to obtain a much better, more tenacious bond between non-oxygenic compounds with the character of hard material and various binding agents in grinding tools of elastic or rigid type of binding, if the corrosion or cauterization has been done in such a way that the abrasives were treated with the oxidizing materials present singly or in admixture. The composition used according to the invention for treating silicon carbide is used in a molten form. The silicon carbide may be present in excess. For example silicon carbide is mixed with such an amount of sodium peroxide, which enables the roughening of surfaces or a cornesponding amount of dissolved agent which acts oxidizing, is spread on silicon carbide. Thus, with the formation of a modified surface in relation to the initial condition of form and/or the synthesis, a substantial improvement is obtained in the bond between the said hard comminuted materials on the one hand and the binding agents on the other.

DESCRIPTION OF THE PREFERRED EMBODIMENTS

As non-metallic, non-oxygenic compounds with the character of hard material, of prime consideration are, for instance, silicon carbide, boron carbide, cubic boron nitride, silicon nitride, silicon boride, beryllium carbide, and beryllium boride.

The binding agent can be either inorganic or organic. In the case of the former, ceramic binding in glass or porcelain, binding with water glass, cement (Sorel cement) may serve as examples, as well as metallic binding, compression of powders and vitrification. As examples of organic binders are the natural or synthetic resins, sizes or rubbers.

Not only can the fused masses from salts of oxygen acids, for instance sodiom nitrate or potassium nitrate, be used as oxidizing materials, but also metallic oxides, peroxides or hydroxides, especially those of alkali or alkaline earth metals, either when applied singly or in admixture. Mixtures are used particularly when relatively lower melting temperatures or special corrosive action are required. Furthermore, it has been proven to be expedient to add other materials, particularly salts facilitating the corosion or effecting a particular alteration of the surface, for instance fluorides.

EXAMPLE 1

Silicon carbide with the grain number 16 (size of grain about 1 mm.) is heated for one hour at 600° C. in a fused mass of potassium nitrate with 2 weight percent of potassium fluoride. The surface of the grain roughens under this treatment and its affinity in relation to the synthetic resin binding increases, as the examination of grinding body or wheel manufactured as follows has shown:

90 weight percent of silicon carbide of the above granulation is moistened with 2 weight percent of liquid phenolic resin and mixed in a planetary mixing vessel. Next 8 weight percent of a finely ground Novolak hexamethylene tetramine are added to the mixture. From this, under a pressure of 20 kg./cm.$^2$, a body measuring 10 x 20 x 120 mm. is produced. This body is heated evenly for four hours under air exclusion from 20 to 95° C. and maintained two more hours at 95° C., and finally heated during the next four hours to 180° C. After a two-hour pause at 180° C. it is cooled under air exclusion. The thus obtained specimen was tested for bending strength resistance by the usual method at a cutting distance of 100 mm. and found to have a value of 580 kg./cm.$^{-2}$. A similar testing body produced from silicon carbide not treated by this method had only exhibited a bending strength of 450 kg./cm.$^{-2}$.

EXAMPLE 2

Boron carbide of 100 granulation (grain size about 180 μm.) is heated for six hours at 500° C. in a fused mass of caustic potash. After the supernatant mass has been poured off, the fusion is rinsed first with water, then with nitric acid and then again with water. The boron carbide pretreated in this fashion, in the manufacture of a testing body as per Example 1, resulted in a bending strength of 530 kg./cm.$^{-2}$ as compared with 420 kg./cm.$^{-2}$ for non-pretreated boron carbide.

EXAMPLE 3

Silicon carbide of a 60 granulation (grain size 280 μm.) is treated for 2 hours with molten caustic potash. The material freed from the melting products is mixed with a 10% bonding clay and pressed into bodies of the size 10 x 20 x 120 mm. under a pressure of 50 kg./cm.$^2$. The pressed articles are then burned at 1400° C. whereupon they show a bending strength of 780 kg./cm.$^{-2}$ as compared with 630 kg./cm.$^{-2}$ in the case of non-pretreated silicon carbide.

The invention claimed is:

1. Method of making an abrasive for use in the manufacture of grinding tools, from comminuted particles of a material selected from the group consisting of silicon carbide, boron carbide, cubic boron nitride, silicon nitride, silicon boride, beryllium carbide and berillium boride, which comprises heating said comminuted particles in a fused mass of potassium nitride with 2 weight percent of potassium fluoride at a temperature of 600° C. and for a time of 1 hour sufficient to roughen the surfaces of said particles, and then mixing said roughened particles with a liquid phenol aldehyde resin and heating such mixture under pressure to bond said particles together.

References Cited

UNITED STATES PATENTS

| | | | |
|---|---|---|---|
| 1,482,792 | 2/1924 | Hartmann | 51—307 |
| 1,482,793 | 2/1924 | Hartmann | 51—307 |
| 2,183,044 | 12/1939 | Klein | 51—307 |
| 2,541,658 | 2/1951 | Masin | 51—307 |
| 2,750,268 | 6/1956 | Erasmus et al. | 51—307 |
| 3,385,682 | 5/1968 | Lowen | 51—307 |

DONALD J. ARNOLD, Primary Examiner

U.S. Cl. X.R.

51—295

UNITED STATES PATENT OFFICE
CERTIFICATE OF CORRECTION

Patent No. 3,549,342         Dated   December 22, 1970

Inventor(s)   Erich G. Hayek

It is certified that error appears in the above-identified patent and that said Letters Patent are hereby corrected as shown below:

Column 3, line 15, "nitride" should read -- nitrate --.

Signed and sealed this 7th day of December 1971.

(SEAL)
Attest:

EDWARD M. FLETCHER, JR.          ROBERT GOTTSCHALK
Attesting Officer                Acting Commissioner of Pat